United States Patent [19]

Wahli

[11] 4,259,053
[45] Mar. 31, 1981

[54] APPARATUS FOR AGGLOMERATING POWDER-FORM MATERIAL

[75] Inventor: Christian Wahli, Bern, Switzerland

[73] Assignee: Societe d'Assistance Technique pour Produits Nestle S.A., Lausanne, Switzerland

[21] Appl. No.: 17,405

[22] Filed: Mar. 5, 1979

[30] Foreign Application Priority Data

Mar. 14, 1978 [CH] Switzerland .......... 2745/78

[51] Int. Cl.³ .............. B29G 7/00
[52] U.S. Cl. .............. 425/222
[58] Field of Search .............. 425/222

[56] References Cited

U.S. PATENT DOCUMENTS

| | | | |
|---|---|---|---|
| 3,463,098 | 8/1969 | Gyde et al. | 425/222 |
| 3,700,461 | 10/1972 | Dickens, Jr. | 425/222 |

Primary Examiner—Donald E. Czaja
Assistant Examiner—James R. Hall
Attorney, Agent, or Firm—Watson, Leavenworth, Kelton & Taggart

[57] ABSTRACT

The invention provides an agglomeration apparatus comprising an agglomeration chamber, a distributor for particles to be agglomerated feeding said chamber, means for projecting a stream of moistening fluid onto the particles and into the chamber, a fixed obstacle generally conical in shape positioned in the chamber in the path followed by the particles and in the axis of the stream of fluid and means for collecting and drying the agglomerates obtained.

Preferably the obstacle is formed by a cone and a frustum placed one on top of the other, the angle at the apex of the cone being smaller than that of the frustum.

5 Claims, 3 Drawing Figures

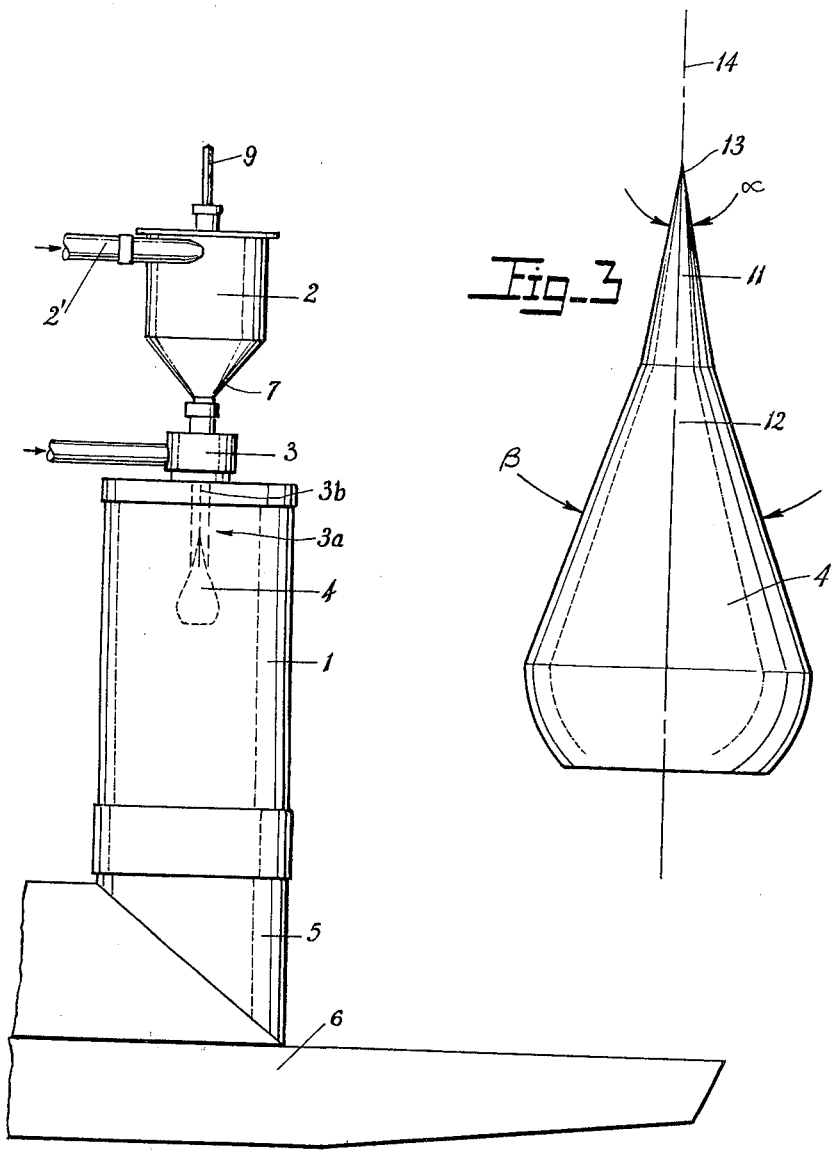

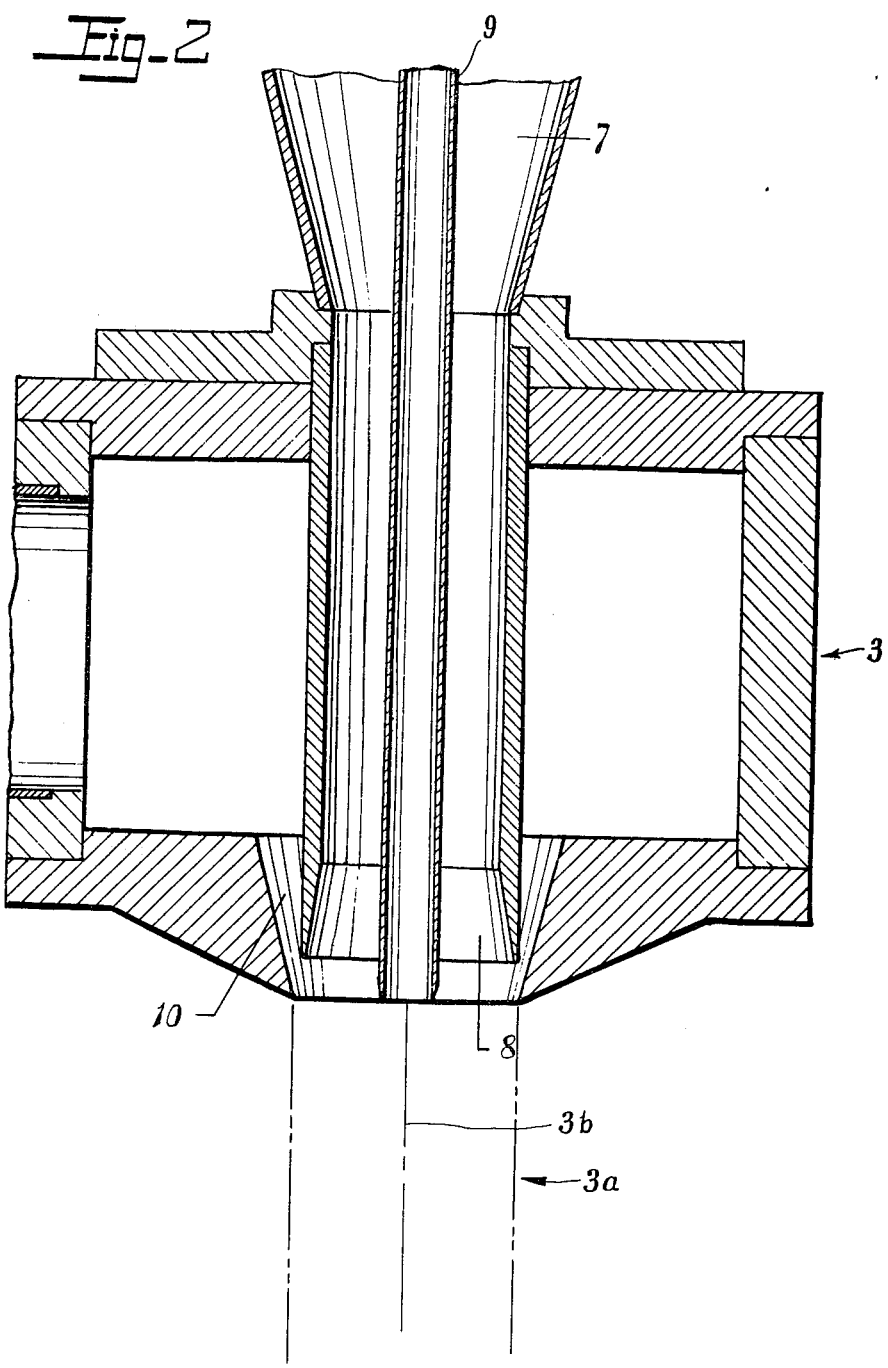

APPARATUS FOR AGGLOMERATING POWDER-FORM MATERIAL

This invention relates to an apparatus for agglomerating particles.

One of the most widely used mechanisms for agglomerating particles is to tackify their surfaces by moistening and/or heating and to bring them into contact with one another to form agglomerates by adhesion of the particles to one another.

There are numerous apparatus for producing agglomerates based on this mechanism. The most widely used employ jets of steam for moistening and/or heating the particles and bringing them into contact with one another.

In order to increase the mechanical strength of the agglomerates, there are processes and apparatus in which the particles are projected against an obstacle.

However, since the particles have been tackified, they have a tendency to adhere not only to one another but also to the obstacle.

In some conventional apparatus, the accumulation of particles on this obstacle is avoided by using a rotating disc or a moving belt with a scraper as the obstacle.

The present invention has the advantage of avoiding the use of moving elements as obstacles.

The present invention provides an apparatus which can be utilized to perform an agglomeration process wherein the particles to be agglomerated are carried by a stream of moistening fluid, such process comprising projecting a stream of particles and fluid onto a fixed obstacle generally conical in shape which is positioned in the axis of the stream, and subsequently collecting and drying the agglomerated particles.

The apparatus of the present invention includes an agglomeration chamber and a distributor for particles to be agglomerated, said distributor communicating with said chamber so that particles disposed in the distributor may be fed into the chamber. The apparatus also includes means for projecting a stream of moistening fluid into the chamber along a predetermined path so that such stream of fluid will entrain particles fed into the agglomerating chamber from the distributor for motion along such predetermined path. A fixed obstacle, generally conical in shape, is disposed in the chamber on the predetermined path of the fluid and entrained particles, the obstacle being coaxial with the path, the apex of the obstacle pointing upstream. During operation of the apparatus, the fluid mixes with the entrained particles and agglomerates such particles. The fluid and the particles impinge on the obstacle; such impact increases the mechanical strength of the particles. The apparatus also includes means for collecting and drying the agglomerated particles.

In one preferred embodiment, the obstacle includes a first portion having the shape of a cone and the second portion having the shape of a frustum of a cone coaxial with the first portion. The first portion surmounts the second portion and defines the apex of the obstacle. In this preferred embodiment, the apex angle of the first or conical portion is smaller than the apex angle of the second or frusto-conical portion. As used herein with reference to a body having the shape of a cone, the term "apex angle" means the interior angle between diametrically opposed generators of such cone at its apex. As used herein with reference to a body having the shape of a frustum of a cone, the term "apex angle" means the interior angle defined by diametrically opposed generators of such frustum.

One embodiment of the invention is illustrated by way of example in the accompanying drawings, wherein:

FIG. 1 is a general view of an apparatus according to the invention.

FIGS. 2 and 3 show details of the apparatus illustrated in FIG. 1.

As shown in the drawing (FIG. 1), the apparatus comprises an agglomeration chamber 1 and a distributor 2 for particles to be agglomerated, fed by a pipe 2'. The apparatus also includes means 3 for projecting a stream of moistening fluid into the chamber 1, along a predetermined path indicated schematically in long and short dashed lines at 3a, the axis of such path being indicated schematically in the long and short dashed lines at 3b. As described in greater detail below, the distributor 2 communicates with the chamber by way of the means 3. A generally cone-shaped obstacle 4 is positioned in the chamber 1 in the path of the particles and in the axis of the stream of fluid means for collecting and drying the agglomerates obtained are provided, such means including a passage 5 and a fluidised-bed dryer 6.

Alternatively, these separate collecting and drying means may be replaced by a drying tower.

FIG. 2 shows the means for projecting the moistening fluid in more detail. This means comprises a feed hopper 7 for particles which leads into a nozzle 8. The nozzle 8 is coaxial with a central tube 9 and surrounded by an annular orifice 10 supplying the fluid. The feed hopper 7 of the means for projecting communicates with the distributor 2 (FIG. 1) so that the distributor communicates with the interior of the chamber by way of the feed hopper and the nozzle 8.

The apparatus operates as follows:

The particles delivered by the pipe 2' are distributed by the distributor 2 and fall into the hopper 7 and then into the nozzle 8. On leaving the nozzle 8, the particles encounter jets of steam issuing from the central tube 9 and the orifice 10. The jets of steam issuing from the central tube 9 and the orifice 10 are projected coaxially with such tube and orifice and thus are projected downstream along the path 3a, indicated schematically in broken lines. As the particles encounter the jets of steam, the particles are entrained and mixed with the steam for motion downstream along the path 3a, which path has an axis 3b extending in its upstream to downstream direction.

The velocity of the steam at the outlet end of the nozzle is preferably between 130 and 200 m/second.

The jets of steam moisten and heat the particles, tackify them, whirl them around, bring them into contact with one another and agglomerate them. Carried by the current of steam, the agglomerates strike the generally conical obstacle 4 disposed in the path of the current, which hardens the agglomerates. The agglomerates fall through the passage 5 into a fluidised-bed dryer 6 where they are dried and led towards the outlet of the dryer, which outlet is not shown in the drawings.

Alternatively, the moistening fluid may be moist air or fine water droplets instead of steam.

The obstacle according to the invention, which is generally conical in shape, has the following advantages over obstacles perpendicular to the stream of particles, such as the plates used in the prior art:

less consumption of steam (0.2 to 0.4 kg of steam per kg of product as opposed to 1 to 1.2 kg of steam per kg of product), more regular and more simple introduction of powder, easier and less frequent cleaning, easier adjustment of the size of the agglomerated particles.

It has been found that the greater the apex angle of the cone and the closer the location of the cone to the jet of moistening fluid, the larger are the agglomerates obtained.

In addition, it has been found that the mechanical strength of the agglomerates increases with their size whereas, in processes and apparatus operating without impact, it decreases. The strength of the agglomerates is determined by screening the agglomerates before and after passage through a rotating parallelepipedic container and reporting the weight of agglomerates retained by a screen having a mesh width of 1 mm as a percentage of the total quantity.

FIG. 3 shows in more detail a preferred embodiment of the generally conical obstacle 4. In FIG. 3, the obstacle includes a first portion 11 having the shape of a cone and a second portion 12 having the shape of a frustum of a cone. These portions are coaxial with one another. The apex angle $\alpha$ of the cone 11 is smaller than the apex angle $\beta$ of the frustum 12. The conical portion 11 defines the apex 13 of the obstacle 4. The axis 14 of the generally conical obstacle extends through the apex of the obstacle perpendicularly of its base.

Good results have been obtained with a cone having an apex angle of approximately 20° and a frustum having an apex angle of approximately 40°. An obstacle such as this is covered with adhering particles far more slowly than a single cone.

Without in any way limiting the invention by this explanation, it appears that the tip of the cone in this shape deflects the jet of steam substantially parallel to the generatrix of the frustum so that the jet sweeps the frustum.

This form has the advantage that it can be readily produced, for example by covering a core with two sheets of polytetrafluoroethylene.

By comparison with a solid body machined by cutting, the sheet-covered body is less "porous" and smoother.

However, the generally conical obstacle could be formed by a downwardly widening surface of revolution of a curved generatrix.

On the other hand, the proportion of fines increases with the distance of the obstacle from the jet of moistening fluid.

The invention is illustrated by the following Examples.

EXAMPLES

Using an apparatus according to the invention, tests were carried out with skimmed milk powder under the following conditions:

| | |
|---|---|
| volumetric weight of the powder to be agglomerated | 720 g/l |
| mean size of the particles to be agglomerated | 35 μm |
| powder throughput | 400 kg/h |
| internal diameter of the agglomeration chamber | 400 mm |

-continued

| | |
|---|---|
| outlet diameter of the agglomeration nozzle | 30 mm |
| pressure of steam on entry | 4.85 kg/cm² |
| pressure of steam on outlet from the nozzle | 0.12 kg/cm² |
| temperature of steam on outlet | 98–103° C. |
| initial velocity of the steam on outlet approx. | 180 m/sec. |
| throughput of steam | 80–90 kg/h. |

Tests were initially conducted with various single cones having a base diameter of approximately 300 mm. These tests enabled the influence of the apex angle of the cone on the mean diameter of the agglomerates and on the degree of agglomeration to be determined.

The degree of agglomeration is determined by screening the agglomerated powder for 3 minutes in a vibrating apparatus provided with screens having mesh widths of 0.1, 0.25, 0.5, 1.0, 1.5, 2.0, 2.5 and 3.0 mm. The degree of agglomeration is defined as the percentage of agglomerates larger than 1 mm (retained by a 1 mm mesh screen).

| Apex angle of cone | Mean diameter of the agglomerates | Degree of agglomeration |
|---|---|---|
| 20° | 1.5 mm | 63.2% |
| 30° | 1.5–2 mm | 67.2% |
| 40° | 2–2.5 mm | 69.4% |

It can be seen that, the greater the apex angle of the cone, the larger the mean diameter of the agglomerates and the higher the degree of agglomeration obtained.

These tests showed that the agglomerated powders obtained by operation of apparatus according to the invention had a much greater proportion of agglomerates larger than 1 mm than known agglomerated powders and a more regular particle size distribution.

In further tests conducted with the same cones, the distance between the tip of the cone and the outlet end of the nozzle was varied in order to determine the influence of this distance on the mechanical strength of the agglomerates.

This mechanical strength was determined by placing the particles larger than 1 mm obtained in the preceding test in a rotating parallelepipedic container for 3 minutes. The residual percentage of particles larger than 1 mm, screened as in the preceding test, was the measure of the mechanical strength of the agglomerates.

This test showed that the mechanical strength of the agglomerates increases slightly when the cone is placed nearer the nozzle. With a 30° cone for example, the residual percentage of particles larger than 1 mm increases from 51 to 58 when the distance from the tip of the cone to the nozzle is reduced from 200 to 50 mm. If the agglomerates are screened to eliminate the largest, this percentage even increases from 61 to 76.

Other tests were carried out with a double cone, i.e. a relatively acute cone having an apex angle of from 20° to 30° superposed on a more obtuse frustum having an apex angle of from 40° to 60° (FIG. 3). The double cone is covered with adhering particles much more slowly than a single cone.

Without in any way limiting the invention by this explanation, it seems that the cone causes the jet of fluid to widen so that the jet follows the frustum.

Good results were obtained with a cone of which the apex angle is approximately half that of the frustum.

The characteristics of the agglomerated powders obtained by operation of apparatus according to the invention are shown in the following Table. The solubility index is determined in accordance with the standards of the American Dry Milk Institute Inc., Chicago, Illinois (Standard for grades of Dry Milks, pages 26–27).

| Distance between nozzle and cone | mm | 200 | | 150 | | |
|---|---|---|---|---|---|---|
| Apex angle of the cone | | 30° | 30° | 20° + 40° | | |
| Characteristics of the agglomerated powder: | | | | | | |
| volumetric weight | g/l | 255 | 240 | 240 | | |
| ADMI solubility | ml | 0.1 | 0.1 | 0.2 | | |
| In water at | | | | | | |
| 20° C. penetrability | sec | 10 | 12 | 15 | | |
| wettability | | good | good | good | | |
| flocculation | | none | none | none | | |
| screen deposit | | traces | 0 | 0 | | |
| 40° C. penetrability | sec | 3.7 | 7.0 | 8 | | |
| wettability | | good | good | good | | |
| flocculation | | none | none | none | | |
| screen deposit | | 0 | 0 | 0 | | |
| 75° C. penetrability | sec | 16 | 6 | 17 | | |
| wettability | | good | good | good | | |
| flocculation | | none | none | none | | |
| screen deposit | | traces | traces | 0 | | |

| Distance between nozzle and cone | mm | 175 | 100 | 75 | 50 | |
|---|---|---|---|---|---|---|
| Apex Angle of the cone | | 20° + 40° | 30° | 20° + 40° | 20° + 40° | 30° |
| Characteristics of the agglomerated powder: | | | | | | |
| volumetric weight | g/l | 235 | 240 | 240 | 240 | 235 |
| ADMI solubility | ml | 0.1 | 0.1 | 0.1 | 0.1 | 0.1 |
| In water at | | | | | | |
| 20° C. penetrability | sec | 14.5 | 15.5 | 16 | 16 | 15 |
| wettability | | good | good | good | good | good |
| flocculation | | none | none | none | none | none |
| screen deposit | | 0 | traces | 0 | 0 | 0 |
| 40° C. penetrability | sec | 8 | 8 | 8.5 | 8.5 | 8 |
| wettability | | good | good | good | good | good |
| flocculation | | none | none | none | none | none |
| screen deposit | | 0 | 0 | 0 | 0 | 0 |
| 75° C. penetrability | sec | 8 | 15.5 | 6 | 6 | 10 |
| wettability | | good | good | good | good | good |
| flocculation | | none | none | none | none | none |
| screen deposit | | tra-ces | traces | 0 | 0 | tra-ces |

I claim:

1. An agglomeration apparatus comprising:
   (a) an agglomeration chamber;
   (b) a distributor for particles to be agglomerated, said distributor communicating with said chamber so that particles disposed in said distributor may be fed into said chamber;
   (c) means for projecting a stream of moistening fluid into said chamber along a predetermined path so that such stream of fluid will entrain particles fed into said agglomerating chamber from said distributor for motion along said path and such particles will be mixed with said fluid and agglomerated thereby;
   (d) a fixed obstacle generally conical in shape, said obstacle being disposed in said chamber on said path, said obstacle being coaxial with said path, the apex of said obstacle pointing upstream, whereby said fluid and said particles will impinge on said obstacle; and
   (e) means for collecting and drying the agglomerated particles.

2. An apparatus as claimed in claim 1, in which the apex angle of the obstacle is between 20° and 40°.

3. An apparatus according to claim 1 in which said obstacle includes a first portion having the shape of a cone and a second portion having the shape of a frustum of a cone, said first portion defining the apex of said obstacle and surmounting said second portion in coaxial relation therewith.

4. An apparatus according to claim 3, in which the apex angle of said first portion is approximately half the apex angle of said second portion.

5. An apparatus according to claim 4, in which the apex angle of said first portion is between 20° and 30° and the apex angle of said second portion is between 40° and 60°.

* * * * *